United States Patent
Li

(10) Patent No.: US 7,714,901 B2
(45) Date of Patent: May 11, 2010

(54) SYSTEMS AND METHODS FOR CONVERTING COLOR IMAGE DATA TO MONOCHROME OUTPUT

(75) Inventor: Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 514 days.

(21) Appl. No.: 11/684,420

(22) Filed: Mar. 9, 2007

(65) Prior Publication Data

US 2008/0218801 A1 Sep. 11, 2008

(51) Int. Cl.
*H04N 5/228* (2006.01)
*G03F 3/08* (2006.01)
*G06K 9/00* (2006.01)

(52) U.S. Cl. .................. 348/222.1; 358/518; 382/154

(58) Field of Classification Search .............. 348/223.1; 358/3.23, 3.26, 462, 464, 512, 515–517, 358/520, 465–466; 382/168–169, 171–172, 382/282

See application file for complete search history.

(56) References Cited

U.S. PATENT DOCUMENTS

| | | | |
|---|---|---|---|
| 6,989,839 B2 | 1/2006 | Braun et al. | |
| 7,215,813 B2 * | 5/2007 | Graves et al. | 382/167 |
| 2003/0038973 A1 | 2/2003 | Lee | |
| 2004/0257378 A1 * | 12/2004 | Braun et al. | 345/591 |
| 2005/0207641 A1 * | 9/2005 | Bala et al. | 382/162 |
| 2007/0019257 A1 * | 1/2007 | Li | 358/518 |

* cited by examiner

*Primary Examiner*—Kelly L Jerabek
(74) *Attorney, Agent, or Firm*—Oliff & Berridge, PLC

(57) ABSTRACT

When converting color input from a color scanner or the like to monochrome output, the measured luminance values are reduced, to help avoid the loss of text or other image portions in the monochrome output. The luminance reduction may be performed based on chrominance values.

20 Claims, 5 Drawing Sheets

SYSTEMS AND METHODS FOR CONVERTING COLOR IMAGE DATA TO MONOCHROME OUTPUT

BACKGROUND

This disclosure relates to converting color image data to monochrome output.

When reproducing a color image, it is often desired to reproduce it in monochrome, such grayscale, rather than in color. U.S. Pat. No. 6,989,839 to Braun et al. discloses some examples of conversions that may be used to convert color to grayscale.

SUMMARY

When an image pickup device such as color scanner or color digital camera is used to capture an image, some color highlight may turn to white or get lost when the captured image data is converted to monochrome output. FIG. 1 shows an example of this phenomenon. In FIG. 1, it can be seen that, due to this phenomenon, some text has been lost at the portion labeled "missing text."

To address this issue, the user could perform an adjustment to make the monochrome image darker. However, this could lead to undesired artifacts such as darker background, etc.

According to exemplary embodiments according to this disclosure, color image data comprising chrominance and luminance values is received from an image pickup device. The luminance values are reduced, based on the chrominance values and/or user input, and the color image date is converted to monochrome image data, using the chrominance values and the reduced luminance values. The converted monochrome image data may be stored for later output, or may be used to mark a monochrome image on a substrate.

These and other features and advantages are described in, or are apparent from, the following detailed description of various exemplary embodiments.

BRIEF DESCRIPTION OF THE DRAWINGS

Various exemplary embodiments will be described in detail, with reference to the following figures, wherein.

EMBODIMENTS

Systems and methods according to this disclosure adjust the luminance values of color image data, such as color image data picked up from a color original by a color scanner, color digital camera or the like, and thereby reduce or eliminate loss of portions of the image when it is converted to monochrome output.

Figure 2:
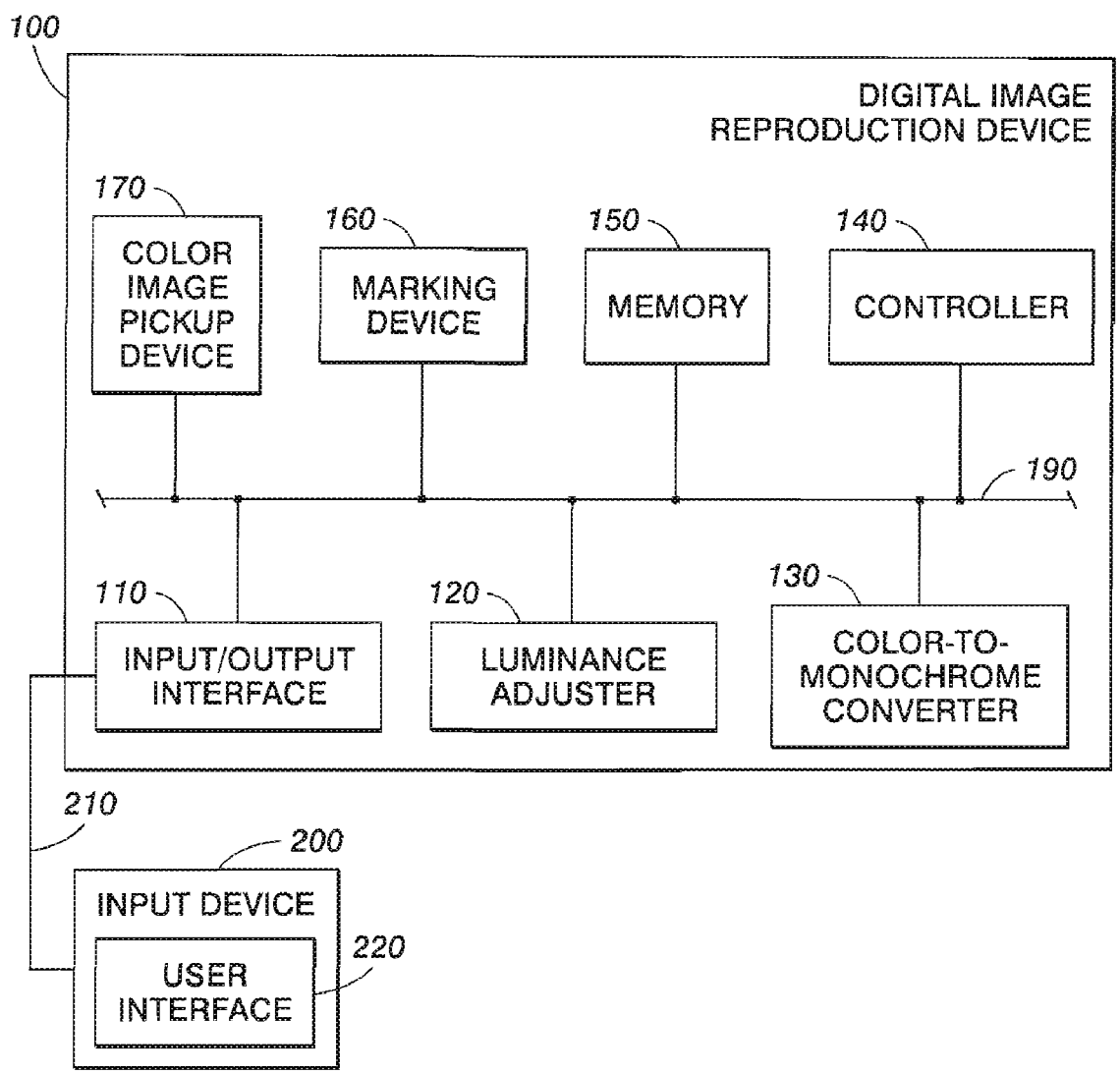
FIG. 2 is a functional block diagram illustrating an exemplary digital image reproduction device.

FIG. 2 is a functional block diagram illustrating an exemplary digital image reproduction device 100. The image reproduction device 100 is connected to an input device 200 via a link 210, which may be a wired, wireless or optical link, and an input/output interface 110. The input device 200, which may include a user interface 220, inputs various information needed to implement the operations of the image reproduction device 100, as described in more detail below. The user input device 200 and/or user interface 220 may include a mouse, a keyboard, a touch-screen input device, a voice recognition-based input device, and/or any other known or later developed device usable for inputting information. The input device 200 and/or user interface 220 may be part of the image reproduction device 100 itself, and, e.g., may be connected directly to the bus 190 and/or controller 140 of the image reproduction device 100, without being connected via an input/output interface such as the input/output interface 110. As one specific example, the image reproduction device 100 may be a digital photocopier, and the user input device 200 and/or user interface 220 may be a touch-screen input device such as is typically present on known photocopiers.

The image reproduction device 100 includes a luminance adjuster 120, a color-to-monochrome converter 130, a controller 140, a memory 150, a marking device 160 and a color image pickup device 170, which are interconnected as appropriate, e.g., by a data/control bus 190. The data/control bus 190 may be a distinct entity, or may be part of the controller 140, for example.

The color image pickup device 170 picks up a color image that is on a substrate such as sheet of paper, plastic or other material, and may, for example, be a known color scanner or the like. The color image pickup device 170 causes light from a light source to be irradiated on the substrate, detects the reflected light, and obtains luminance and chrominance information based on the reflected light, in a known manner.

The marking device 160 may be a known xerographic marking device or a known print engine and print head, for example, which marks an image on a substrate based on input image data. The input image data may be, but is not limited to, image data obtained by the color image pickup device. The marking device 160 can at least mark monochrome images, and optionally may also be able to mark color images. U.S. Pat. No. 6,989,839, incorporated herein by reference in its entirety, describes examples of marking monochrome images based on scanned color images.

The memory 150 may serve as a buffer for information coming into or going out of the image reproduction device 100, may store any necessary programs and/or data for implementing the functions of the image reproduction device 100, such as a program for causing a computer to implement the exemplary methods described below, and/or may store data at various stages of processing. Furthermore, it should be appreciated that the memory 150, while depicted as a single entity, may actually be distributed. Alterable portions of the memory 150 are, in various exemplary embodiments, implemented using static or dynamic RAM. However, the memory 150 can also be implemented using a floppy disk and disk drive, a writeable optical disk and disk drive, a hard drive, flash memory or the like. The generally static portions of the memory 150 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The controller 140 controls the operation of other components of the image reproduction device 100, performs any necessary calculations and executes any necessary programs for implementing the processes of the image reproduction device 100 and its individual components, and controls the flow of data between other components of the image reproduction device 100 as needed.

The color-to-monochrome converter 130 may convert color image data picked up by the color image pickup device 170 to monochrome data for output by the marking device 160. The color-to-monochrome converter 130 may operate each time an image is marked, if color input is always to be converted to monochrome output, or may operate only at selected times, e.g., when instructed by a user via the input device 200 and/or user interface 220. The conversion performed by the color-to-monochrome converter 130 may be a known conversion, such as is described in U.S. Pat. No. 6,989,839, for example.

As indicated above, the color image pickup device 170 obtains luminance and chrominance information from a color image. For example, in the L*a*b* color space, L* represents the luminance information, and a*b* collectively represent chrominance information, or values from which chrominance information may be derived. The luminance adjuster 120 adjusts luminance information in a way that reduces or eliminates the problem shown in FIG. 1. For example, the luminance adjuster 120 reduces the luminance information for each pixel, before or during conversion by the color-to-monochrome converter 130. Further details of adjustment by the luminance adjuster will be described below with reference to FIG. 4.

Figure 3:
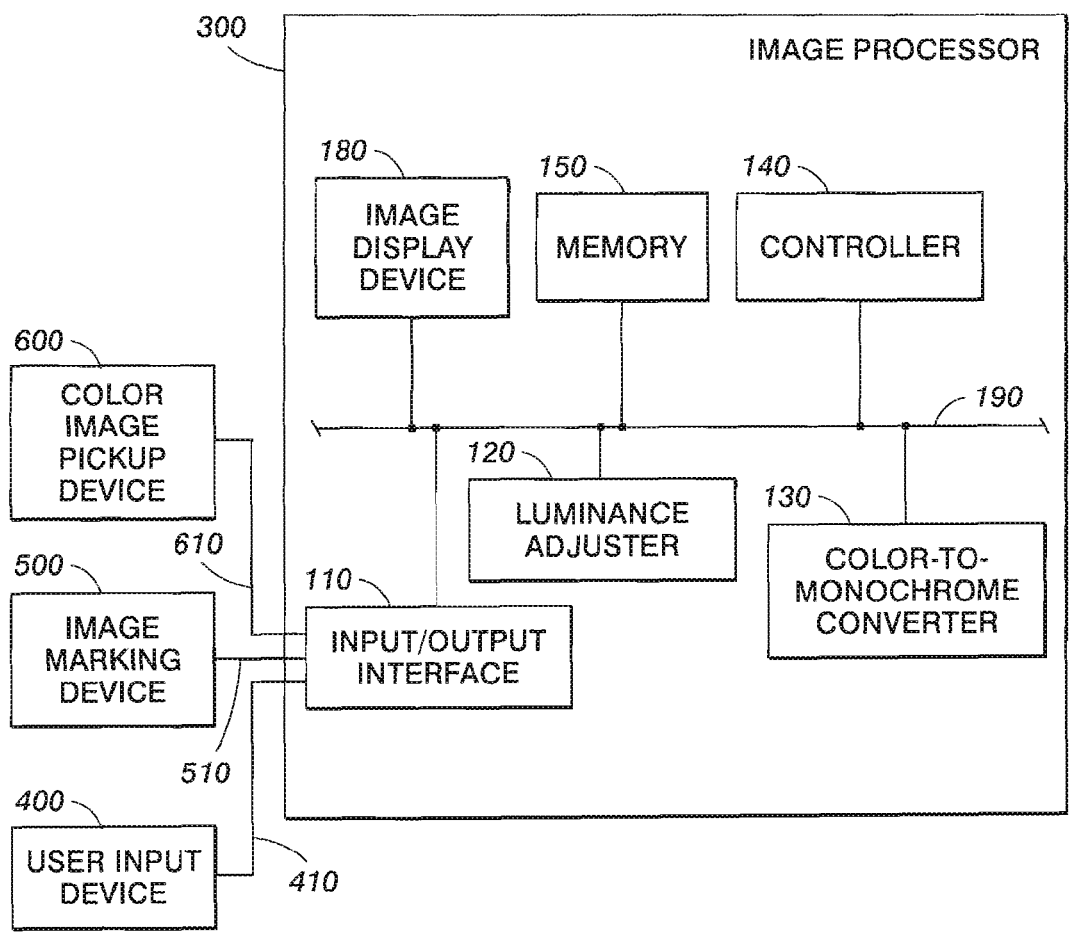
FIG. 3 is a functional block diagram illustrating an exemplary image processor.

FIG. 3 is a functional block diagram illustrating an exemplary image processor 300. The image processor 300 may, for example, be a general purpose computer and is connected to a user input device 400, an image marking device 500, and a color image pickup device 600, via links 410, 510 and 610, respectively, which may be wired, wireless or optical links, possibly connected via a network (not shown). The structure and/or function of the input device 400, the image marking device 500, and the color image pickup device 600 may be basically the same as the input device 200 and/or user interface 220, the image marking device 160 and the color image pickup device 170 of FIG. 2. The color image pickup device 600 may be a scanner, for example, and the image marking device 500 may be a printer, for example, or a photocopier operating as a printer. The image marking device 500 and the color image pickup device 600 may be combined in a single device, and be connected to the image processor 300 via a common link.

The structure and/or function of the luminance adjuster 120, the color-to-monochrome converter 130, the controller 140 and the memory 150 of FIG. 3 may be the same as those of FIG. 2. The image processor 300 may also include or be connected (e.g., via the bus 190 or the input/output interface 110) to an image display device 180, such as a computer monitor or display screen, that displays the picked-up image prior to marking by the image marking device 500.

It will be understood that the circuits shown in FIGS. 2 and 3, e.g., the luminance adjuster 120, the color-to-monochrome converter 130, the controller 140, or portions of any of these, can be implemented as portions of a suitably programmed general purpose computer. Alternatively, each of the circuits shown in FIGS. 2 and 3 can be implemented as physically distinct hardware circuits within an ASIC, or using a FPGA, a PDL, a PLA or a PAL, or using discrete logic elements or discrete circuit elements. The particular form each of the circuits shown in FIGS. 2 and 3 will take is a design choice and will be obvious and predictable to those skilled in the art.

Figure 4:
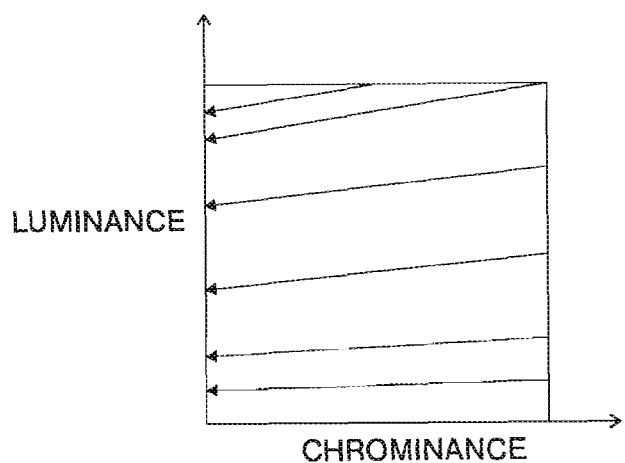
FIG. 4 is a graph illustrating an exemplary reduction of luminance values.

FIG. 4 is a graph illustrating an exemplary reduction of luminance values. As depicted, the luminance values may be reduced based on chrominance values of the pixels. As shown, luminance values of pixels having relatively higher chrominance may be reduced more than luminance values of pixels having relatively lower chrominance. At least some amount of luminance reduction may be performed for all of the pixels, or reduction may only be performed for some of the pixels, such as the pixels having relatively higher luminance. As depicted in FIG. 4, luminance values of pixels initially having relatively higher luminance, i.e., having relatively higher measured luminance values, are reduced more than luminance values of pixels initially having relatively lower luminance, i.e., having relatively lower measured luminance values.

The reduction of the luminance values shown in FIG. 4 may be performed by implementing the following equation:

$$L^*_{new} = L^*(1-\alpha C)$$

where L* is the initial (i.e., measured) luminance value of a pixel, C is the chrominance value of the pixel, α is a multiplication factor and $L^*_{new}$ is the reduced luminance value of the pixel. All points on the arrowed lines in FIG. 4 are mapped to the L*axis, i.e., the "luminance" axis, FIG. 4 shows the concept of reduction, but numerical values of luminance and chrominance are not given, because the numerical values will depend, e.g., on the color space used. This algorithm may be implemented in hardware, for example, when a dedicated monochrome path exists in the system (e.g., in the image reproduction device 100 of FIG. 2 or the image processor 300 of FIG. 3), or it can be used to construct L*a*b* to CMYK conversion tables or L*a*b* to YCC conversion tables, for example, when a color path is used for monochrome output.

The value for α may be empirically determined and then unchangeably programmed (e.g., programmed by the manufacturer in a way that is not changeable by the user) into the system, or may be made user-changeable, based on user preference.

The chrominance value C may be measured or approximated by any known or later developed method. As one example, when using the L*a*b* color space, the chrominance may be approximated as:

$$C = \max(a^*, b^*) + \min(a^*, b^*)/2$$

One advantage of thus reducing the luminance value based on the chrominance value is that white background pixels, which sometimes have non-zero (but small) chrominance values, remain suppressed after the adjustment. The illustrated mapping equation uses linear transformation, which achieves smooth transition in color space, but other mapping algorithms are possible as well.

As an exemplary alternative to the above-described algorithm, the system may be unchangeably programmed, or programmable based on user input, to perform a preset amount of luminance reduction on some or all of the pixels. For example, the system may be set to reduce the luminance of the highest-chrominance 10%, 20%, 30%, 40% or 50% of pixels by a preset amount, and not to reduce the luminance of other pixels.

Figure 1:
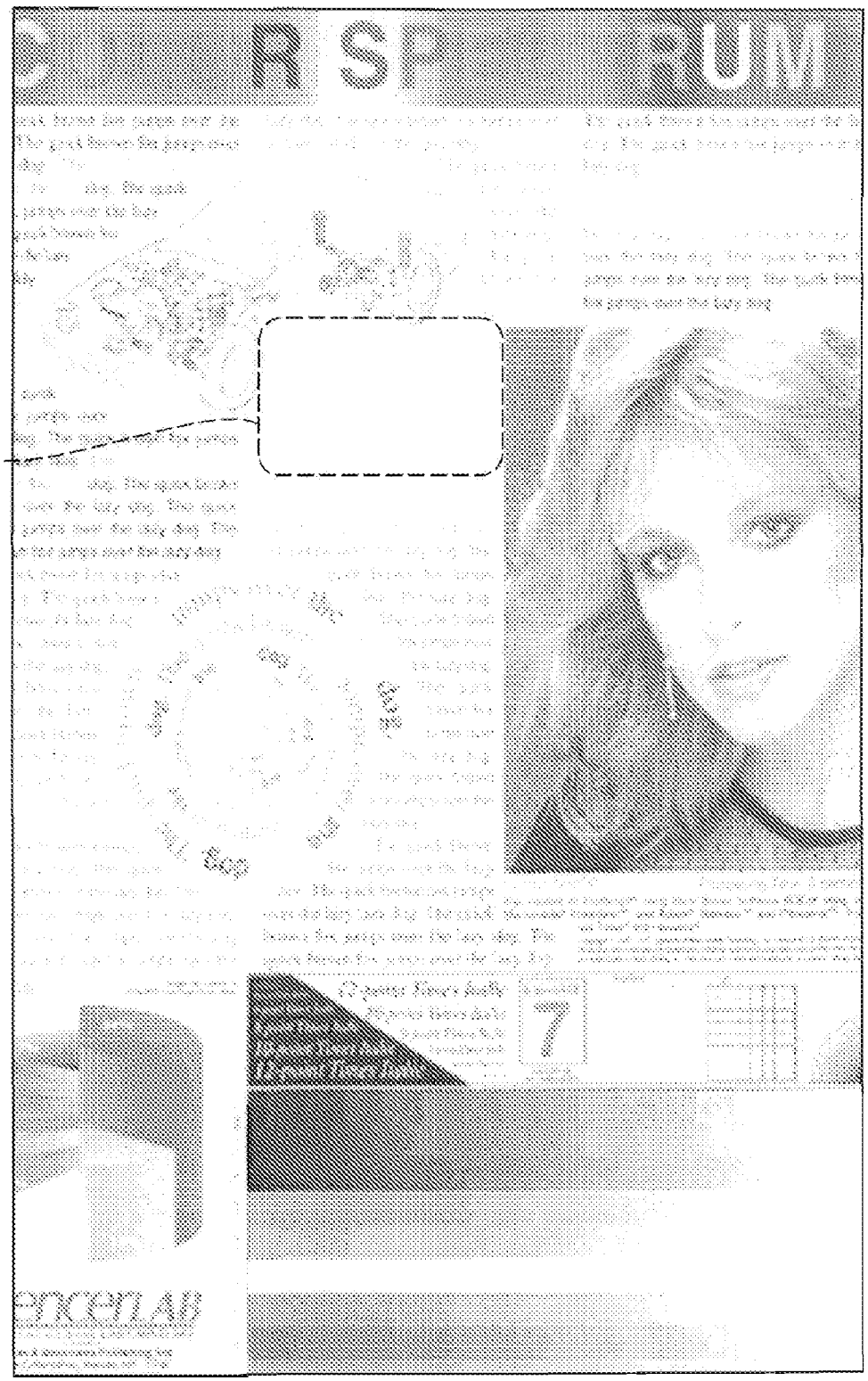
FIG. 1 illustrates a conventional monochrome output of a scanned color original.
Figure 5:
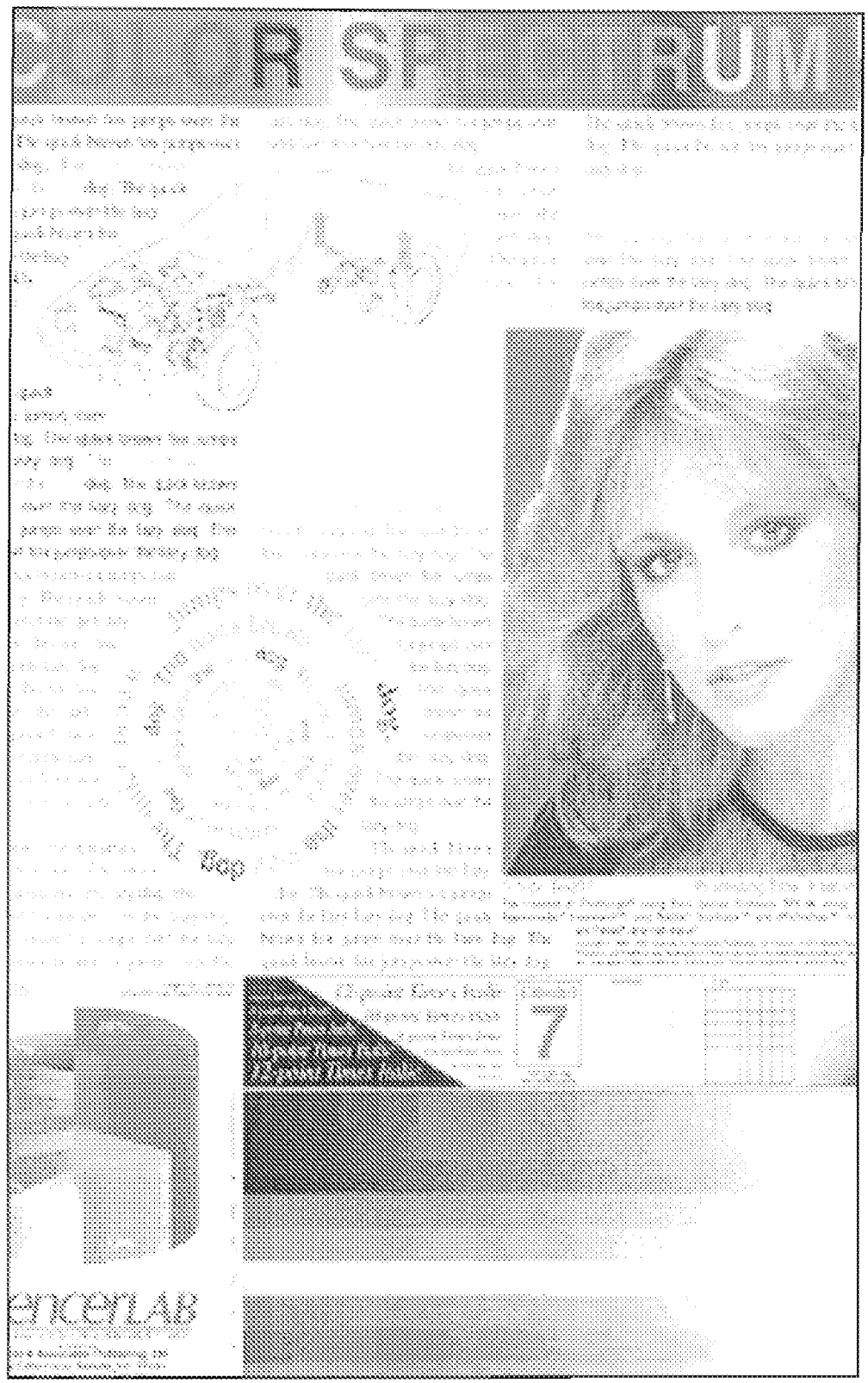
FIG. 5 illustrates a monochrome output of a scanned color original.

FIG. 5 illustrates a monochrome output of a scamped color original, after a luminance reduction has been implemented as described above. As can be seen in FIG. 5, text portions are not lost, in contrast to what is shown in FIG. 1.

Figure 6:
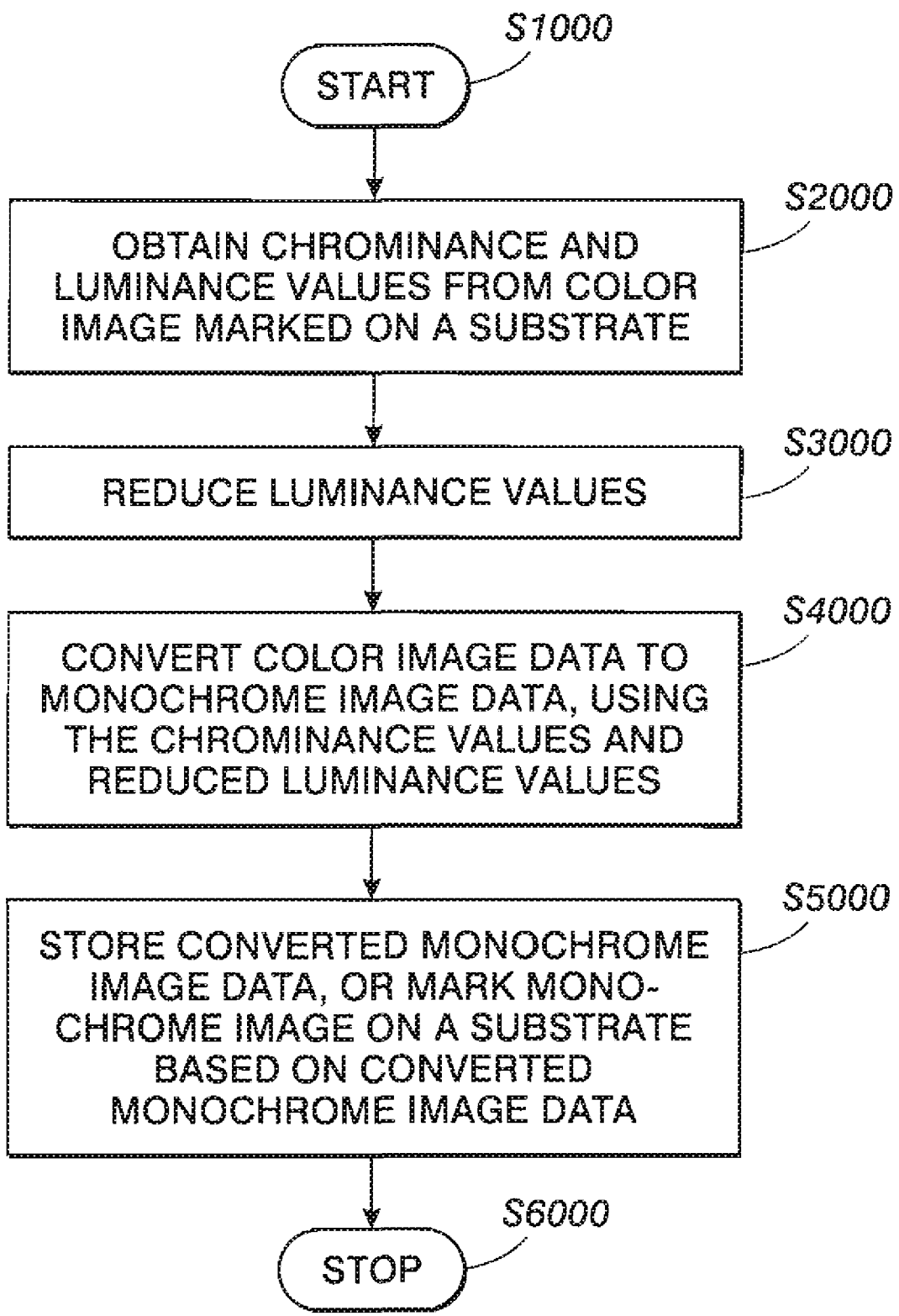
FIG. 6 is a flowchart illustrating an exemplary method of converting color image data to monochrome output.

FIG. 6 is a flowchart illustrating an exemplary method of converting color image data to monochrome output. Beginning in step S1000, the method continues to step S2000, and obtains chrominance and luminance values from a color image on a substrate. For example, as described above, the chrominance and luminance values nay be obtained from a color scanner or the like.

Continuing to step S3000, the luminance values are reduced, as described above. The method continues to step S4000, and converts the color image data to monochrome data, using the reduced luminance values. It will be appreciated that steps S3000 and S4000 nay be performed in the depicted sequence, or may be performed concurrently.

The method then continues to step S5000, where the converted monochrome data is stored for later output, or is used to mark a monochrome image on a substrate. The program then proceeds to step S6000 and stops.

Appropriate portions of the image reproduction device 100 of FIG. 2 and the image processor 300 of FIG. 3 are preferably implemented either on a single program general purpose computer or separate programed general purpose computers. However, the image reproduction system 100 and the image processor 300 can also be implemented on a special purpose computer, a programmed micro-processor or micro-controller and peripheral integrated circuit element, an ASIC or other integrated circuit, a digital signal processor a hard-wired electronic or logic circuit such as a discrete element circuit, a programmable logic device such as a PLD, PLA, FPGA, PAL, or the like. In general, any device capable of implementing a finite state machine that is in turn capable of implementing the flowchart shown in FIG. 6, or appropriate portions thereof, can be used.

Furthermore, the disclosed methods may be readily implemented in software using object or object-oriented software development environments that provide portable source code that can be used on a variety of computer or workstation hardware platforms. Alternatively, appropriate portions of the disclosed image reproduction system 100 and the image processor 300 may be implemented partially or fully in hardware using standard logic circuits or a VLSI design. Whether software or hardware is used to is dependent on the speed and/or efficiency requirements of the system, the particular function, and the particular software or hardware systems or microprocessor or microcomputer systems being utilized. The processing systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a micro-processor, or the like. In this case, the above-described methods and systems can be implemented as a routine embedded on a personal computer or as a resource residing on a server or workstation, such as a routine embedded in a photocopier, a color photocopier a printer driver, a scanner, or the like. The systems and methods can also be implemented by physical incorporation into a software and/or hardware system, such as the hardware and software system of a photocopier or a dedicated image processing system.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An image processing method, comprising:
receiving, from an image pickup device, color image data of an image, the color image data comprising chrominance and luminance values obtained by the image pickup device from a color image that is on a substrate;
reducing the luminance values in a way that eliminates loss of portions of the image during a subsequent conversion of the color image data to monochrome image data;
converting the color image data to monochrome image data, using the chrominance values and the reduced luminance values; and
storing the converted monochrome image data for later output by a marking device, or marking a monochrome image on a substrate based on the converted monochrome image data.

2. The method of claim 1, wherein reducing the luminance values comprises reducing luminance values of pixels based on chrominance values of the pixels.

3. The method of claim 2, wherein luminance values of pixels having relatively higher chrominance are reduced more than luminance values of pixels having relatively lower chrominance.

4. The method of claim 2, wherein luminance values of pixels initially having relatively higher luminance are reduced more than luminance values of pixels initially having relatively lower luminance.

5. The method of claim 1, further comprising receiving user input corresponding to a desired amount of luminance value reduction, wherein reducing the luminance values is performed based on the user input.

6. A machine-readable medium on which is stored instructions that, when executed by a processor, cause the processor to perform the method of claim 1.

7. The method of claim 1, wherein the luminance value of each pixel of the color image data is reduced.

8. An image processing method, comprising:
receiving, from an image pickup device, color image data comprising chrominance values and luminance values of pixels obtained by the image pickup device from a color image that is on a substrate;
reducing the luminance values based on the chrominance values, the reducing the luminance values comprising implementing the following equation:

$$L^*_{new} = L^*(1-\alpha C)$$

where $L^*$ is the initial luminance value of a pixel, C is the chrominance value of the pixel, $\alpha$ is a multiplication factor and $L^*_{new}$ is the reduced luminance value of the pixel;
converting the color image data to monochrome image data, using the chrominance values and the reduced luminance values; and
storing the converted monochrome image data for later output by a marking device, or marking a monochrome image on a substrate based on the converted monochrome image data.

9. The method of claim 8, further comprising receiving user input corresponding to a desired value for $\alpha$, and using the desired value for $\alpha$ while implementing the equation.

10. An image processor, comprising a controller that:
receives, from an image pickup device, color image data comprising chrominance and luminance values obtained by the image pickup device from a color image physically marked on a substrate;

reduces the luminance values;
converts the color image data to monochrome image data, using the chrominance values and the reduced luminance values; and
stores the converted monochrome image data for later output, or causes a marking device to mark a monochrome image on a substrate based on the converted monochrome image data.

11. The image processor of claim 10, wherein the controller reduces the luminance values by reducing luminance values of pixels based on chrominance values of the pixels.

12. The image processor of claim 11, wherein luminance values of pixels having relatively higher chrominance are reduced more than luminance values of pixels having relatively lower chrominance.

13. The image processor of claim 11, wherein luminance values of pixels initially having relatively higher luminance are reduced more than luminance values of pixels initially having relatively lower luminance.

14. The image processor of claim 10, wherein the controller reduces the luminance values by implementing the following equation:

$$L^*_{new} = L^*(1-\alpha C)$$

where $L^*$ is the initial luminance value of a pixel, C is the chrominance value of the pixel, $\alpha$ is a multiplication factor and $L^*_{new}$ is the reduced luminance value of the pixel.

15. The image processor of claim 14, further comprising a user input device through which is received user input corresponding to a desired value for $\alpha$, wherein the controller implements the equation using the value for $\alpha$ indicated by the user input.

16. The image processor of claim 10, further comprising a user input device through which is received user input corresponding to a desired amount of luminance value reduction, wherein the controller reduces the luminance values based on the user input.

17. A system, comprising:

the image processor of claim 10; and an image marking device that receives the converted monochrome image data from the image processor and marks a monochrome image on a substrate based on the converted monochrome image data.

18. The system of claim 17, wherein the system is a digital photocopier or a facsimile machine.

19. The system of claim 17, wherein the marking device is a xerographic marking device.

20. The image processor of claim 10, wherein the luminance value of each pixel of the color image data is reduced.

* * * * *

UNITED STATES PATENT AND TRADEMARK OFFICE
CERTIFICATE OF CORRECTION

PATENT NO. : 7,714,901 B2  Page 1 of 1
APPLICATION NO. : 11/684420
DATED : May 11, 2010
INVENTOR(S) : Xing Li It is certified that error appears in the above-identified patent and that said Letters Patent is hereby corrected as shown below:

On the Title page, item (75) Inventor:
change: "Xing Ll, Webster, NY (US)"
to: --Xing Li, Webster, NY (US)--

Signed and Sealed this

Twenty-third Day of November, 2010

David J. Kappos
*Director of the United States Patent and Trademark Office*